Figure 1:
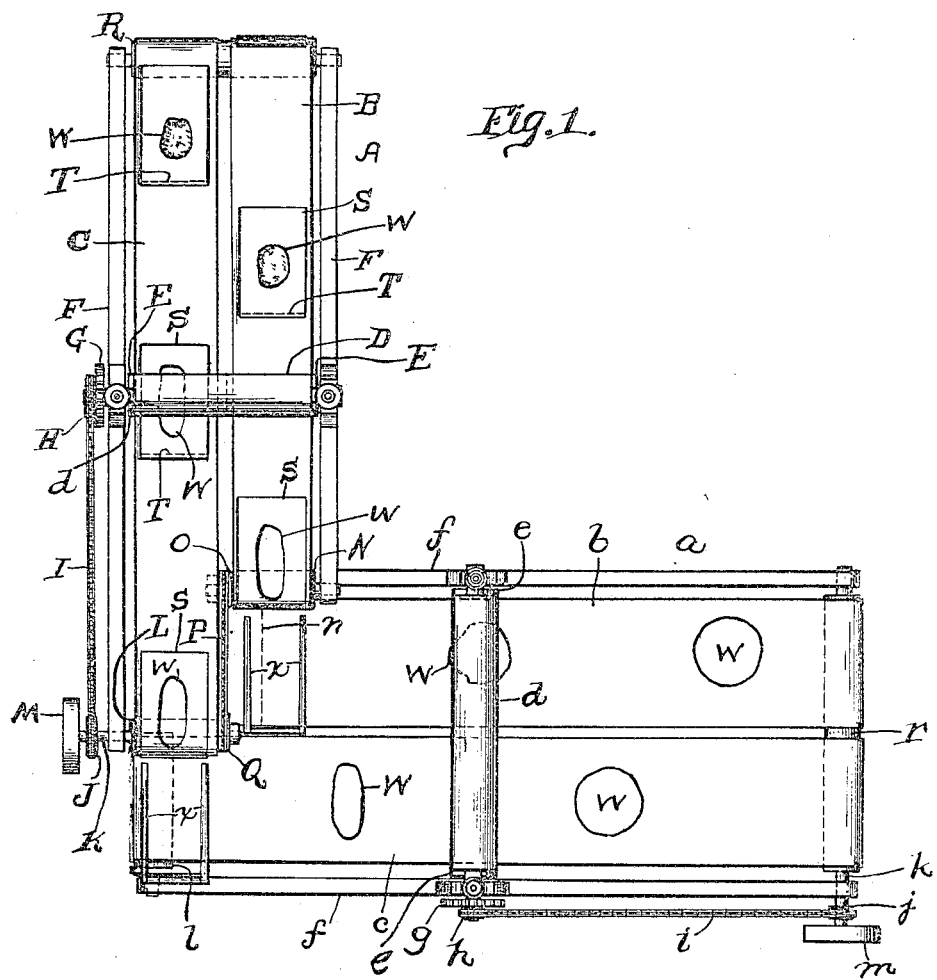

No. 787,273. PATENTED APR. 11, 1905.
J. H. BURNS.
DOUGH ROLLING OR DOUGH SPREADING APPARATUS.
APPLICATION FILED SEPT. 21, 1903.

2 SHEETS—SHEET 1.

WITNESSES:
Daniel E. Daly.
G. M. Hayes.

INVENTOR
Joseph H. Burns
BY
Lynch & Dorer
his ATTORNEYS

No. 787,273. PATENTED APR. 11, 1905.
J. H. BURNS.
DOUGH ROLLING OR DOUGH SPREADING APPARATUS.
APPLICATION FILED SEPT. 21, 1903.
2 SHEETS—SHEET 2.
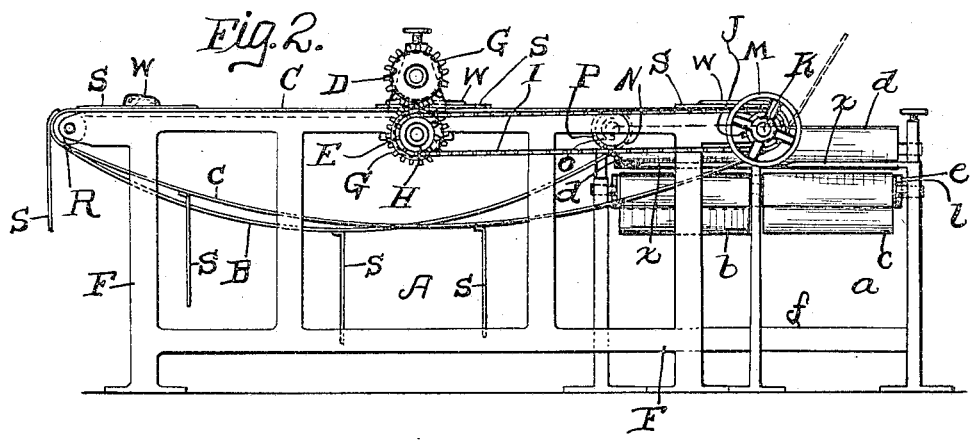
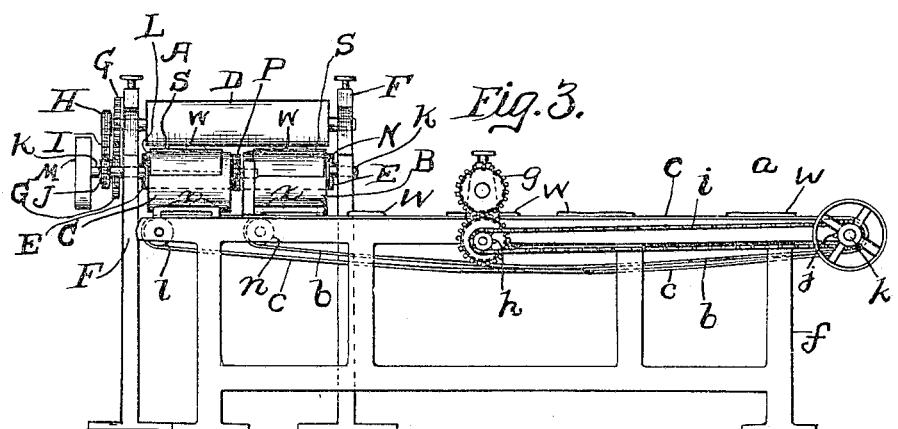
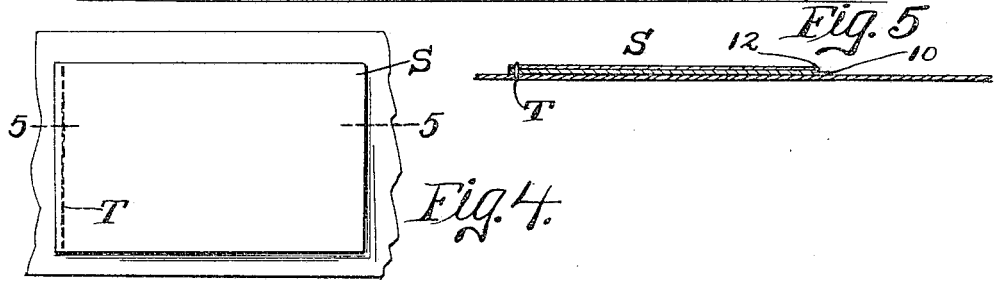
WITNESSES:
Daniel E. Daly
G. M. Hayes
INVENTOR
Joseph H. Burns
BY
Lynch & Dorer
ATTORNEYS No. 787,273.

Patented April 11, 1905.

UNITED STATES PATENT OFFICE.

JOSEPH H. BURNS, OF CLEVELAND, OHIO.

DOUGH-ROLLING OR DOUGH-SPREADING APPARATUS.

SPECIFICATION forming part of Letters Patent No. 787,273, dated April 11, 1905.

Application filed September 21, 1903. Serial No. 173,965.

*To all whom it may concern:*

Be it known that I, JOSEPH H. BURNS, a citizen of the United States of America, residing at Cleveland, in the county of Cuyahoga and State of Ohio, have invented certain new and useful Improvements in Dough-Rolling or Dough-Spreading Apparatus; and I hereby declare the following to be a full, clear, and exact description of the invention, such as will enable others skilled in the art to which it pertains to make and use the same.

This invention relates to improvements in dough-rolling or dough-spreading apparatus more especially designed for rolling or operating upon a chunk or piece of dough and flattening and forming it into an oblong shape and then rolling or operating upon the flattened and elongated piece of dough and spreading the latter into an approximately circular shape or layer and overturning the elongated piece of dough between the aforesaid operations.

This invention consists more especially in dough-spreading apparatus comprising a table having a dough-feeding belt or conveyer instrumental in forming the upper side of the said table, means for actuating the said conveyer, another table arranged in suitable proximity to the first-mentioned table and comprising a movable dough-feeding belt or conveyer arranged to receive a piece of dough operated upon and fed by the conveyer of the first-mentioned table, and means whereby a chunk or piece of dough operated upon the first-mentioned table is delivered onto the other table and turned over during its delivery to the last-mentioned table.

One object of this invention is to perform two operations upon a chunk or piece of dough, and thereby roll or spread the dough into an approximately circular layer and overturn the piece of dough between the two dough-rolling or dough-spreading operations.

Another object is to roll chunks or pieces of dough into the desired form economically and with great facility.

Another object is to first roll a chunk or piece of dough, and thereby elongate the same, upon an elastic and compressible apron or seat and then actuate the said apron or seat, and thereby overturn the elongated piece of dough and roll or spread the same into an approximately circular layer.

With these objects in view and to the end of providing a machine or apparatus which is reliable in its operation this invention consists in certain features of construction and combinations of parts hereinafter described, and pointed out in the claims.

In the accompanying drawings, Figure 1 is a top plan of a machine or apparatus embodying my invention. Figs. 2 and 3 are elevations taken at right angles to each other. Fig. 4 is a top plan of a portion of the apron-carrying belt or conveyer of the apparatus. Fig. 5 is a section on line 5 5, Fig. 4, looking in the direction indicated by the arrow.

Referring to the drawings, A and *a* designate two dough-rolling tables arranged at right angles to each other, with the table A somewhat higher than the table *a*. The table A comprises two dough-feeding endless belts or conveyers B and C, which are actuated simultaneously in the same direction and in unison and form the upper surface of the said table, with the upper and dough-feeding portions of the said conveyers arranged in the same plane horizontally. The table *a* comprises two endless belts or conveyers *b* and *c*, which are actuated simultaneously in the same direction and in unison and form the upper surface of the said table *a*, with the upper and dough-feeding portions of the said conveyers arranged in the same horizontal plane. The upper and dough-feeding portions of the conveyers *b* and *c* are arranged at an elevation a suitable distance below the upper and dough-feeding portions of the conveyers B and C. The conveyers B and *b*, arranged adjacent to the inner corner formed by and between the tables A and *a*, are somewhat shorter than the conveyers C and *c*, arranged adjacent the outer corner formed by and between the said tables, as shown very clearly in Fig. 1, to accommodate the feeding of partially-rolled pieces of dough simultaneously by the conveyers B and C to the conveyers *b* and *c*, respectively. Preferably the conveyer B at the dough-delivering end of the table A somewhat overhangs the conveyer *b* at the dough-receiving end of the table $a$, and the conveyer C at the dough-delivering end of the table A somewhat overhangs the conveyer $c$ at the dough-receiving end of the table $a$. Obviously the conveyers B and C are actuated in the direction required to feed dough rolled thereon, as will hereinafter appear, to the conveyers $b$ and $c$, respectively, and the latter are actuated in the direction required to feed the dough delivered thereto away from the conveyers B and C.

Any approved means for operating the different conveyers may be provided, and each table is provided with suitable means for rolling the pieces of dough fed by the conveyers of the said table.

As shown, the table A comprises two horizontal rolls D and E, which extend transversely of the said table at the upper side and lower side, respectively, of the upper and dough-feeding portions of the conveyers B and C and are arranged at a right angle to the said conveyers. The rolls D and E are arranged in the same plane vertically, and the lower roll E forms a bottom bearing for the upper and dough-feeding portions of the conveyers B and C. The said rolls are supported in any approved manner from the stationary framework F of the table A and are intergeared at one end with each other, as at G, so that the said rolls during their rotation turn in opposite directions, respectively, as required, and one of the gears G, employed in establishing operative connection between the rolls D and E, is operatively provided with a sprocket-wheel H, which is arranged in line axially with the respective gear and operatively connected by a chain I with a spocket-wheel J, which is operatively mounted on a shaft K, suitably supported from the framework F and arranged parallel with the rolls D and E. The longer conveyer C of the table A leads at the dough-delivering end of the said table over a suitably-supported roller L, employed in actuating the said conveyer, and is operatively mounted on or connected with the shaft K, which is operatively provided with a driving-wheel M, to which power is applied in any approved manner. The shorter conveyer B of the table A leads at the dough-delivering end of the said table over a suitably-supported roller N, employed in actuating the said conveyer B and operatively provided with a sprocket-wheel O, which is operatively connected by a chain P with a sprocket-wheel Q, operatively mounted, connected with the roller L. Both conveyers B and C of the table A lead at the dough-receiving end of the said table over a guide-roller R, which is supported from the framework F.

The parts are so arranged and timed that chunks or pieces of dough delivered to the conveyers B and C in advance of the upper roll D are fed in under the said roll to the conveyers $b$ and $c$, respectively, of the table A and rolled, and thereby elongated longitudinally of the conveyers B and C during their passage to the conveyers $b$ and $c$.

Each conveyer of the table A is provided at its outer side with aprons S, spaced equidistantly and arranged longitudinally of the said conveyer. Each apron S is attached at its forward end only, preferably by stitching the said apron at the said end, as at T, to and transversely of the respective conveyer, to the said conveyer, so that the said apron is capable of being swung upwardly and in the direction of the table B, as will hereinafter more clearly appear.

The rolls D and E are located, preferably, centrally between the ends of the table A.

A chunk W of dough to be rolled and spread is placed upon each apron S as the said apron, during the actuation of the conveyer carrying the apron, approaches the roll D. A chunk W of dough having been placed upon an apron S preparatory to the feeding of the same to and in under the roll D is operated upon during its passage in under the said roll and rolled, and thereby spread longitudinally of the said apron, and consequently longitudinally of the conveyer carrying the said apron. Fig. 1 illustrates the feeding of two chunks of dough to be rolled, one chunk of dough being rolled, and thereby elongated longitudinally of the table A, and two chunks of dough having been elongated upon the said table and about to be delivered to the conveyers $b$ and $c$, respectively, of the table $a$. Of course each apron S, preparatory to the deposit thereon of a chunk of dough, is suitably floured, and the said chunk of dough is floured on top preparatory to its passage under the roll D.

The aprons S of the conveyers of the table A are flexible and yet sufficiently stiff to render them capable of swinging upwardly toward and over the table B during the passage of the said aprons around the driving-rollers of the said conveyers. In dotted lines, Fig. 2, a dough-laden apron is shown swinging from the table A upwardly toward and over the table $a$.

Obviously each dough-laden apron of each conveyer of the table A in swinging from over the said conveyer toward and over the respective conveyer of the table $a$ overturns its load—an elongated chunk of dough—and deposits the latter onto and transversely of and at a right angle to the said last-mentioned conveyer.

The aprons S of each conveyer of the table A are preferably arranged alternately with the aprons S of the other conveyer of the said table, as shown, so that only one dough-carrying apron of the one or the other of the said conveyers is rolled at one and the same time upon the table A. It is obvious, therefore, that any inequality in the thickness of the chunks of dough delivered to the aprons of the different conveyers of the table A does not interfere with a proper rolling of the dough upon the said table.

Each apron S consists, preferably, of a sheet 10 of rubber or other elastic and compressible material covered by a sheet 12 of canvas or similarly closely woven textile fabric, as shown in Fig. 5, with the canvas arranged to form the upper side of the apron during the travel of the apron over the table A. Each apron S forms, therefore, an elastic and compressible seat for a chunk of dough to be operated upon, and although the yielding capability of the seat thus formed is quite desirable I have found that the canvas forms a more suitable surface on which to operate upon the dough than rubber.

To prevent the aprons S of the conveyers B and C of the table A from flapping directly against the conveyers $b$ and $c$ of the table $a$ during the delivery of the partially-rolled dough from the table A onto the table $a$, the stationary framework $f$ of the table $a$ is provided, over each conveyer of the said table $a$ and in suitable proximity to the upper surface of the upper and dough-feeding portion of the said conveyer, with two arms $x$, which are arranged transversely of the said conveyer and arranged such a distance apart longitudinally of the conveyer and in such position relative to the respective apron-carrying conveyer of the table A that each apron S of the said apron-carrying conveyer will upon swinging toward and over the table $a$ flap against the said arms, so that any partially-rolled dough carried by the said apron will be positively freed from the apron and fall overturned between the said arms onto the respective conveyer of the table $a$, and any flour on the said apron will be shaken from the apron and deposited onto and distributed over the overturned elongated piece of dough. It will be observed, therefore, that the arrangement of the parts is such that a chunk or piece of dough elongated upon the table A is during its delivery from the said table to the table $a$ deposited upon the latter crosswise of the respective dough-feeding conveyer of the last-mentioned table. An apron S having struck against the respective pair of arms $x$ of the table $a$ and delivered partially-rolled dough to the said table is during the actuation of the conveyer carrying the said apron removed from the table $a$ and from over the dough thus delivered onto the said table, and another dough-laden apron approaches the said table. Preferably the arrangement of the parts is such that both conveyers B and C of the table A deliver dough simultaneously to the conveyers $b$ and $c$, respectively, of the table $a$.

As shown, the table $a$ comprises two horizontal rolls $d$ and $e$, which extend transversely of the said table at the upper side and lower side, respectively, of the upper and dough-feeding portions of the conveyers $b$ and $c$ and are arranged at a right angle to the said conveyers. The rolls $d$ and $e$ are arranged in the same plane vertically and preferably about centrally between the ends of the table $a$. The lower roll $e$ forms a bottom bearing for the upper and dough-feeding portions of the conveyers $b$ and $c$. The rolls $d$ and $e$ are suitably supported from the framework $f$ and are intergeared with each other, as at $g$, so that the said rolls during their rotation turn in opposite directions, respectively, as required. One of the gears, $g$, establishing operative connection between the rolls $d$ and $e$, is operatively provided with a sprocket-wheel $h$, which is arranged in line axially with the respective gear and operatively connected by a chain $i$ with a sprocket-wheel $j$, which is operatively mounted on the shaft $k$, supported from the framework $f$ and arranged parallel with the rolls $d$ and $e$. The longer conveyer $c$ of the table $a$ leads at the dough-receiving end of the said table over a suitably-supported guide-roller $l$. The shorter conveyer $b$ of the table $a$ leads at the dough-receiving end of the said table over a suitably-supported guide-roller $n$. Both conveyers $b$ and $c$ of the table $a$ lead at the opposite end of the said table over a roller $r$, which is supported from the framework $f$ and employed in actuating the said conveyers. The roller $r$ is operatively mounted on or connected with the shaft $k$, which is operatively provided with a driving-wheel $m$, to which power is applied in any approved manner. As already indicated, both conveyers B and C of the table A simultaneously deliver dough to the conveyers $b$ and $c$, respectively, of the table $a$; but as the conveyer $c$ being adjacent the outer corner formed by and between the tables A and $a$ is longer than the conveyer $b$ obviously the simultaneous delivery of dough from the different conveyers of the table A onto the different conveyers, respectively, of the table $a$ will result in the arrangement of the pieces of dough successively delivered to each conveyer of the table $a$ alternately with the pieces of dough successively delivered to the other conveyer of the said table $a$, so that the upper roll $d$ of the table $a$ shall roll only one piece of dough at a time, or, in other words, shall operate alternately upon dough fed by the different conveyers, respectively, of the table $a$.

By the arrangement of the parts hereinbefore described it will be observed that the partially-rolled and elongated pieces of dough delivered from the different conveyers of the table A to and crosswise of the different conveyers, respectively, of the table $a$ are fed to and in under and rolled by the roll $d$ of the last-mentioned table, and thereby spread into an approximately circular layer, as shown.

Fig. 1 of the drawings illustrates the feeding of a partially-rolled elongated piece of dough to the roll $d$, another elongated piece of dough being rolled widthwise by the roll $d$, and thereby spread into an approximately circular layer, and two pieces of dough in the form of circular layers ready to be removed from the table *a*.

What I claim is—

1. The combination, with means for operating upon a chunk or piece of dough and flattening and forming it into an oblong shape, and means for operating upon the flattened and elongated piece of dough and spreading the latter into an approximately circular shape, of means whereby the aforesaid elongated piece of dough is turned over between the aforesaid operations.

2. The combination, with means for operating upon a chunk or piece of dough and elongating it, and means for operating upon the elongated piece of dough and spreading the latter widthwise, of mechanical means whereby the said layer is turned over between the aforesaid operations.

3. The combination, with means for rolling a chunk or piece of dough into an oblong shape, and means for rolling the elongated piece of dough into an approximately circular layer, of means whereby the said layer is turned over between the aforesaid dough-rolling operations.

4. In a machine for performing two operations upon a chunk or piece of dough and thereby spreading the dough into an approximately circular layer, of means whereby the said layer is turned over between the aforesaid operations.

5. In combination, a table comprising a movable dough-feeding belt or conveyer instrumental in forming the upper side of the said table, means for actuating the said conveyer, another table arranged in suitable proximity to the first-mentioned table and comprising a movable dough-feeding belt or conveyer arranged to receive a piece of dough operated upon and fed by the conveyer of the first-mentioned table, and means whereby a chunk or piece of dough operated upon on the first-mentioned table is delivered onto the other table and turned over during its delivery to the last-mentioned table.

6. In combination, a table comprising a movable dough-feeding belt or conveyer instrumental in forming the upper side of the said table, means for actuating the said conveyer, another table arranged to receive a piece of dough operated upon over and fed by the aforesaid conveyer, and means whereby a piece of dough delivered to the last-mentioned table is turned over during its delivery to the said last-mentioned table.

7. In combination, a dough-receiving table, another table comprising a movable dough-feeding belt or conveyer arranged to receive a piece of dough operated upon on and fed by the first-mentioned table, means for actuating the said conveyer, and means whereby a piece of dough operated upon on the first-mentioned table is delivered to the aforesaid conveyer and turned over during its delivery to the said conveyer.

8. In combination, two tables arranged at a right angle or at an approximately right angle to each other and in suitable proximity to each other and comprising each a dough-feeding movable belt or conveyer, with the conveyer of one of the tables arranged to receive a piece of dough fed by the conveyer of the other table; means for actuating the conveyers, and means whereby the piece of dough fed by the last-mentioned table is delivered to the conveyer of the other table and turned over during its said delivery.

9. In combination, two tables arranged at an angle and in suitable proximity to each other and comprising each a movable dough-feeding belt or conveyer, with the conveyer of one of the tables arranged to receive a piece of dough fed by the conveyer of the other table; means for actuating the conveyers, and means whereby the piece of dough fed by the conveyer of the last-mentioned table is delivered to the conveyer of the other table and turned over during its said delivery.

10. In combination, two tables arranged at an angle and in suitable proximity to each other and comprising the one a belt or conveyer arranged to receive a piece of dough operated upon on the other table; means for actuating the said conveyers, and means whereby a piece of dough operated upon over the last-mentioned table is delivered to the aforesaid conveyer and turned over during its said delivery.

11. In combination, two tables arranged at an angle and in suitable proximity to each other and comprising the one a dough-feeding belt or conveyer arranged to feed a piece of dough to the other table, means for actuating the said conveyer, and means whereby the piece of dough fed to the last-mentioned table by the aforesaid conveyer is turned over during its delivery to the said last-mentioned table.

12. In combination, two tables arranged at an angle to each other and comprising each a movable dough-feeding belt or conveyer instrumental in forming the upper surface of the respective table, with the upper and dough-feeding portion of the conveyer of one of the tables arranged at an elevation above and overhanging the conveyer of the other table; means for actuating the conveyers, and means whereby the piece of dough is turned over during its delivery from the higher onto the lower conveyer.

13. In combination, two tables arranged in suitable proximity to each other and comprising each a movable dough-feeding belt or conveyer instrumental in forming the upper surface of the respective table, with the upper and dough-feeding portion of the conveyer of one of the tables arranged at an elevation above the conveyer of the other table; means for actuating the conveyers, and means whereby the dough is turned over during its delivery from the higher onto the lower conveyer.

14. In combination, a table comprising a dough-feeding belt or conveyer instrumental in forming the upper surface of the said table, and means for rolling a piece of dough upon and longitudinally of the said conveyer; another table arranged in suitable proximity and at an angle to the first-mentioned table and comprising a dough-feeding belt or conveyer and means for rolling the dough upon and longitudinally of the last-mentioned conveyer, and means for effecting the delivery, to and crosswise of the last-mentioned conveyer, of the piece of dough elongated upon the first-mentioned table.

15. In combination, a table comprising a dough-feeding belt or conveyer instrumental in forming the upper surface of the said table, and means for rolling a chunk or piece of dough upon and elongating it longitudinally of the said conveyer, another table in suitable proximity to the first-mentioned table and comprising a dough-feeding belt or conveyer and means for rolling the dough upon and longitudinally of the last-mentioned conveyer, and means for effecting the delivery, to and crosswise of the last-mentioned conveyer, of the piece of dough elongated upon the first-mentioned table.

16. In combination, a table comprising a dough-feeding belt or conveyer instrumental in forming the upper surface of the said table and means for rolling a chunk or piece of dough upon and elongating it longitudinally of the said conveyer, another table arranged in suitable proximity to the first-mentioned table and comprising a dough-feeding belt or conveyer and means for rolling the dough upon and longitudinally of the last-mentioned conveyer, and means for effecting, not only the delivery, to and crosswise of the last-mentioned conveyer, of the piece of dough elongated upon the first-mentioned table, but also turning the dough over during the said delivery.

17. In combination, a table comprising means for rolling a chunk or piece of dough upon and elongating it longitudinally of the said conveyer, and another table arranged in suitable proximity to the first-mentioned table and comprising means for rolling the dough upon and longitudinally of the second-mentioned table, and means for effecting the delivery, to and crosswise of the said second-mentioned table, of the piece of dough elongated upon the first-mentioned table.

18. The combination, with two dough-rolling tables arranged in suitable proximity to each other, of means for swinging the piece of dough rolled upon one of the said tables over and onto the other table.

19. The combination, with a dough-rolling table comprising a dough-feeding belt or conveyer, and another dough-rolling table arranged in suitable proximity to the first-mentioned table and comprising a dough-feeding belt or conveyer, of means whereby the piece of dough rolled upon and elongated longitudinally of the first-mentioned table is swung over and onto and delivered crosswise of the conveyer of the second-mentioned table.

20. In combination, a table comprising a roller at one end and a dough-feeding belt or conveyer leading over the said roller and instrumental in forming the upper surface of the table, and another table arranged at an angle and in suitable proximity to and overhung by the said conveyer at the aforesaid roller, and the roller-engaging conveyer being provided, at its outer surface, with dough-receiving aprons arranged at suitable intervals longitudinally of the conveyer, which aprons are attached to the conveyer only at the forward ends and capable of swinging, as they move around the aforesaid roller during the actuation of the conveyer in the required direction, upwardly toward and over so as to thereby deliver the dough thereon onto the last-mentioned table.

21. In combination, a table comprising a roller at one end and a dough-feeding belt or conveyer leading over the said roller and instrumental in forming the upper surface of the table and provided with aprons arranged at suitable intervals longitudinally of the conveyer, which aprons are attached and arranged relative to the conveyer as required to render them capable of swinging upwardly and over in passing over the said roller during the actuation of the conveyer in the direction required to feed the laden aprons to and over the said roller, and another table arranged to receive the dough lifted and turned over by the aforesaid aprons when the latter swing as aforesaid.

22. In combination, a table comprising a roller at one end and a dough-feeding belt or conveyer leading over the said roller and instrumental in forming the upper surface of the table and provided with flexible aprons arranged at suitable intervals longitudinally of the conveyer, which aprons are attached and have such arrangement relative to the conveyer that they are capable of swinging upwardly and over in passing over the said roller during the actuation of the conveyer in the direction required to feed the laden aprons to and over the said roller, and another table arranged to receive the dough lifted and turned over by the aforesaid aprons when the latter swing as aforesaid.

23. The combination, with a table comprising a roller at one end and a dough-feeding belt or conveyer leading over the said roller and provided with aprons arranged at suitable intervals longitudinally of the conveyer, which aprons are attached and have such arrangement relative to the conveyer that they are capable of swinging upwardly and over in passing over the said roller during the actuation of the conveyer in the direction required to actuate the aprons to and over the said roller, and another table comprising a dough-feeding belt or conveyer arranged to receive the dough lifted and turned over by the aforesaid swinging of the aprons, of stationary framework provided with two arms arranged a suitable distance above and transversely of the last-mentioned conveyer and suitably spaced longitudinally of the said conveyer, and the arrangement of the parts being furthermore such that the aprons in swinging as aforesaid flap onto the said arms and dough carried by the swinging aprons is deposited between the said arms onto the last-mentioned conveyer.

24. In combination, two dough-feeding conveyers relatively arranged to feed dough the one to the other; means for actuating the conveyers, and means whereby the dough is turned over during its delivery from the one to the other conveyer.

25. The combination, with two dough-rolling tables arranged in suitable proximity to each other, of means whereby a piece of dough rolled on one of the said tables is delivered onto the other table and turned over during its delivery.

26. The combination, with two dough-feeding conveyers arranged to accommodate the delivery of dough from the one to the other of the said conveyers; means for rolling dough on the said conveyers, and means whereby a piece of dough rolled on and elongated longitudinally of one of the said conveyers is delivered onto and crosswise of the other conveyer.

27. In combination, an endless dough-feeding conveyer provided with dough-receiving aprons suitably spaced longitudinally of the conveyer, which aprons are attached to the conveyer only at their forward ends and capable of swinging upwardly and in the direction in which the upper and dough-feeding portion of the said conveyer moves during the actuation of the conveyer; means for rolling the dough carried by the aprons; another conveyer arranged to receive dough turned over by the aprons during the swinging of the aprons as aforesaid, and means for rolling the dough upon the last-mentioned conveyer.

28. In combination, an endless dough-feeding conveyer provided with dough-receiving aprons suitably spaced longitudinally of the conveyer, which aprons are attached to the conveyer only at their forward ends and capable of swinging upwardly and in the direction in which the upper and dough-feeding portion of the said conveyer moves during the actuation of the conveyer, and means for rolling the dough carried by the aprons.

29. The combination, with an endless dough-feeding conveyer provided with aprons suitably spaced longitudinally of the conveyer, which aprons are attached at their forward ends only and are arranged to swing upwardly and in the direction in which the upper and dough-feeding portion of the conveyer moves during the actuation of the conveyer; another conveyer arranged to receive dough lifted and turned over by the aforesaid swinging of the aprons; stationary framework provided with two members arranged a suitable distance above and transversely of the last-mentioned conveyer and suitably spaced longitudinally of the said conveyer and arranged to form stops for the aprons during the swinging of the aprons, and the arrangement of the parts being furthermore such that the dough-laden aprons in swinging as aforesaid flap onto and deliver their dough between the aforesaid transversely-arranged members of the stationary framework.

30. The combination, with mechanical means for rolling a chunk or piece of dough into an oblong shape, mechanical means for rolling the oblong piece of dough widthwise of the said piece, and means for conveying the dough from the first-mentioned dough-rolling means to the second-mentioned dough-rolling means.

In testimony whereof I sign the foregoing specification, in the presence of two witnesses, this 31st day of August, 1903, at Cleveland, Ohio.

JOSEPH H. BURNS.

Witnesses:
C. H. DORER,
G. M. HAYES.